(12) United States Patent
Pearson

(10) Patent No.: US 7,236,525 B2
(45) Date of Patent: Jun. 26, 2007

(54) RECONFIGURABLE COMPUTING BASED MULTI-STANDARD VIDEO CODEC

(75) Inventor: Eric C. Pearson, Conestogo (CA)

(73) Assignee: LSI Corporation, Milpitas, CA (US)

( * ) Notice: Subject to any disclaimer, the term of this patent is extended or adjusted under 35 U.S.C. 154(b) by 788 days.

(21) Appl. No.: 10/443,973

(22) Filed: May 22, 2003

(65) Prior Publication Data

US 2004/0233994 A1  Nov. 25, 2004

(51) Int. Cl.
*H04N 7/12* (2006.01)
*H04N 11/02* (2006.01)
(52) U.S. Cl. .............................. 375/240.12; 375/240.25
(58) Field of Classification Search ........... 375/240.12, 375/240.25
See application file for complete search history.

(56) References Cited

U.S. PATENT DOCUMENTS

| 5,537,601 | A | * | 7/1996 | Kimura et al. ................. 712/35 |
| 5,784,636 | A | * | 7/1998 | Rupp ........................... 712/37 |
| 6,275,891 | B1 | | 8/2001 | Dao et al. .................... 710/132 |
| 2003/0222144 | A1 | * | 12/2003 | Meier et al. ................. 235/454 |

* cited by examiner

*Primary Examiner*—Gims Philippe
*Assistant Examiner*—Erick Rekstad
(74) *Attorney, Agent, or Firm*—Christopher P. Maiorana PC

(57) ABSTRACT

A circuit generally comprising a multiport memory, a direct memory access engine and a programmable gate array is disclosed. The direct memory access engine may be configured to transfer a first program to the multiport memory. The programmable gate array may be configured to (i) load the first program directly from the multiported memory to program a codec function and (ii) generate a video output signal by performing the codec function on a video input signal using video data exchanged with the multiport memory.

19 Claims, 3 Drawing Sheets

RECONFIGURABLE COMPUTING BASED MULTI-STANDARD VIDEO CODEC

FIELD OF THE INVENTION

The present invention relates to video coding and decoding generally and, more particularly, to a reconfigurable computing based multi-standard video codec.

BACKGROUND OF THE INVENTION

Architecture design for new video coding and decoding standards seek tradeoffs that: lower die costs to a target budget, maintain die size to within a limited area, shorten time to market and permits some fixes to be applied as needed, while maximizing flexibility to allow implementation of as many existing and possible future codec standards as possible. Common solutions involve re-using previously existing hardwired blocks and then adding new blocks as each new standard develops. The conventional approaches involve guessing how undefined future codec standards might impact a current design.

Use of a reduced instruction set computer (RISC) central processor unit (CPU) in the design allows some of the standard processing to be implemented in software. The software, in turn, allows reusing the CPU hardware for many applications and for limited fixes to the hardware design. Some existing video codec designs implement a single-instruction stream multiple-data stream (SIMD) array processor to cover as many different standards as possible. Some filters and other hardwired blocks allow coefficients to be programmed, as parameters are determined after the hardware design has been completed. Hardware errors are commonly fixed by iterations of the die design and/or with software patches, where possible.

However, adding modules increases dies size and the amount of un-utilized hardware at any given moment. RISC CPUs are flexible, but lack in sheer speed for video tasks. Specialized SIMDs are good for an intended target. However, as with hardwired units, the flexibility added to a SIMD design to handle known standard variations causes inefficiencies in the hardware use. The inefficiencies increases die area and adaptation to new standards is not always good. Using programable coefficients for filters which only need fixed coefficients increases the filter size unnecessarily. Design changes at the die level to change the hardwired functions are costly and time consuming. Software patches can sometimes be applied, but usually result in some form of performance tradeoff which degrades operation.

SUMMARY OF THE INVENTION

The present invention concerns a circuit generally comprising a multiport memory, a direct memory access engine and a programmable gate array. The direct memory access engine may be configured to transfer a first program to the multiport memory. The programmable gate array may be configured to (i) load the first program directly from the multiported memory to program a codec function and (ii) generate a video output signal by performing the codec function on a video input signal using video data exchanged with the multiport memory.

The objects, features and advantages of the present invention include providing a reconfigurable computing based multi-standard video codec that may (i) decrease die size, (ii) improve hardware utilization, (iii) provide multiple hardware configurations residing in memory, (iv) be implemented at a lower cost than a conventional design, (v) improve time to market over conventional approaches, (vi) allow codec development to occur while back end chip layout is occurring and/or (vii) improve flexibility to accommodate new video code standards without die revision.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
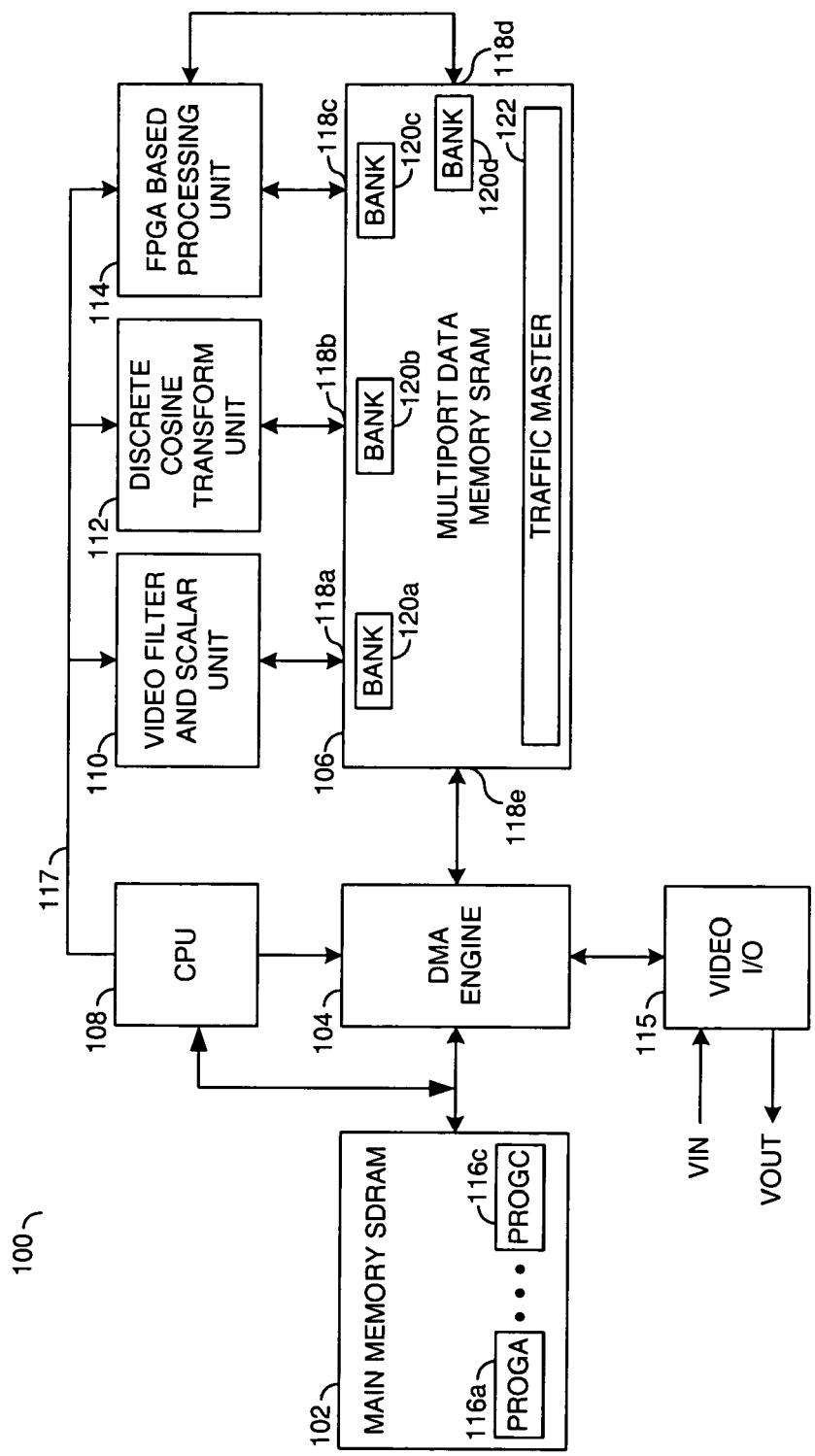
FIG. 1 is a block diagram of a circuit in accordance with a preferred embodiment of the present invention.

Referring to FIG. 1, a block diagram of a circuit 100 is shown in accordance with a preferred embodiment of the present invention. The circuit 100 may be implemented as a video codec circuit. The video codec circuit 100 generally comprises a memory block or module 102, a block or module 104, a memory block or module 106, a processor block or module 108, a processor block or module 110, another processor block or module 112, a processor block or module 114 and a block or module 115.

The memory module 102 may be implemented as a main memory module. In one embodiment, the main memory module 102 may be designed as a synchronous dynamic random access memory. Other solid state memory technologies may be implemented to meet the criteria of a particular application. The main memory module 102 may store one or more programs 116a–c.

The module 104 may be implemented as a direct memory access engine (DMA). The DMA engine module 104 may be operational to transfer the software programs 116a–c from the main memory module 102 to the memory module 106. The DMA engine module 104 may also move data between the main memory module 102 and the memory module 106. The data may include macroblocks (e.g., 16 by 16 tiles of adjacent pixels of a video frame). Parameters and control information for the particular transfers may be provided to the DMA engine module 104 from the processor module 108.

The memory module 106 may be implemented as a multiport memory module. In one embodiment, the multiport memory module 106 may be designed with synchronous RAN to provide a low latency access to the programs 116a–c and data stored within. The latency of the multiport memory module 106 may be lower than the latency of the main memory module 102. The multiport memory module 106 may have multiple interfaces or ports 118a–e. Each port 118a–d may be arranged to provide access to an independent bank of memory 120a–d within the module 106 as directed through a traffic master 122. Further details of the multi-port memory module 116 may be found in U.S. Pat. No. 6,275,891, hereby incorporated by reference in its entirety.

The module 108 may be implemented as a central processor unit (CPU). In one embodiment, the CPU module 108 may be a reduced instruction set computer (RISC) CPU. Other types of CPU modules may be implemented to meet the design criteria of a particular application. The CPU module 108 is generally responsible for setup and control of the other modules 104, 110, 112, 114, 115 and 122.

The module 110 may be implemented as a programmable video filter and scaling module or unit. The module 110 may be configured to perform filtering and scaling functions common to many video processing operations. A direct connection may be made between the video filter and scalar module 110 and the port 118a of the multiport memory module 106 to exchange video data and information with the multiport memory module 106. The video filter and scalar module 110 may receive parameters and other information from the CPU module 108 through a direct connection 117 related to the filtering and/or scalar functions.

The module 112 may be implemented as a programmable video discrete cosine transform (DCT) module or unit. The video DCT module 112 may be applicable to multiple video standards. A direct connection may be made between the video DCT module 112 and the port 118b of the multiport memory module 106 to exchange video data and information with the multiport memory module 106. The video DCT module 112 may receive parameters and other information from the CPU module 108 through the direct connection 117 related to the DCT functions.

The module 114 may be implemented as a programmable logic device. In one embodiment, the module 114 may be implemented as a field programmable gate array (FPGA). The FPGA module 114 of the present invention may be programmable through the port 118d of the multiport memory module 106. Programming may comprise loading one or more of the programs 116a–c before coding/decoding video data or during a single frame of video data. The FPGA module 114 may also be directly connected to the port 118c of the multiport memory module 106 to exchange video data and information with the multiport memory module 106. The FPGA module 114 may receive parameters (e.g., decimation parameters, filter coefficients and the like) and other information from the CPU module 108 through the direct connection 117.

The FPGA module 114 may be programmable to support video digital signal processor (DSP) operations for a wide variety of video codec standards. For example, the FPGA module 114 may be configurable to support MPEG-1, MPEG-2, MPEG-4, H.264 encode, H.264 decode and WM-9 standards. The FPGA module 114 may enable the circuit 100 to accommodate new video codec standards as the new standards may be developed by adjusting one or more programs 116a–c or generating a new program. Connections to the FPGA module 114 may include communication with the CPU module 108 to receive processing commands and parameters, direct access to the multiport memory module 106 to read and write data, and read access to the multiport memory module 106 for the FPGA configuration programs 116a–c (e.g., gate configuration and interconnect).

The module 115 may be implemented as a video I/O module. The video I/O module 115 may transfer video data received in a video input signal (e.g., VIN) to the multiport memory module 106. The video I/O module 115 may also transfer processed video data from the multiport memory module 106 through a video output signal (e.g., VOUT).

The programs 116a–c may configure the FPGA module 114 to perform one or more video coding and/or video decoding operations. The operations may include, but are not limited to, de-telecine, activity measures, motion compensation, adaptive temporal and de-interlace filtering, linear filtering, decimation, discrete cosine transforms, inverse discrete cosine transforms, quantization, de-quantization, variable length encoding and variable length decoding. Other operations may be loaded to meet the criteria of a particular standard.

Figure 2:
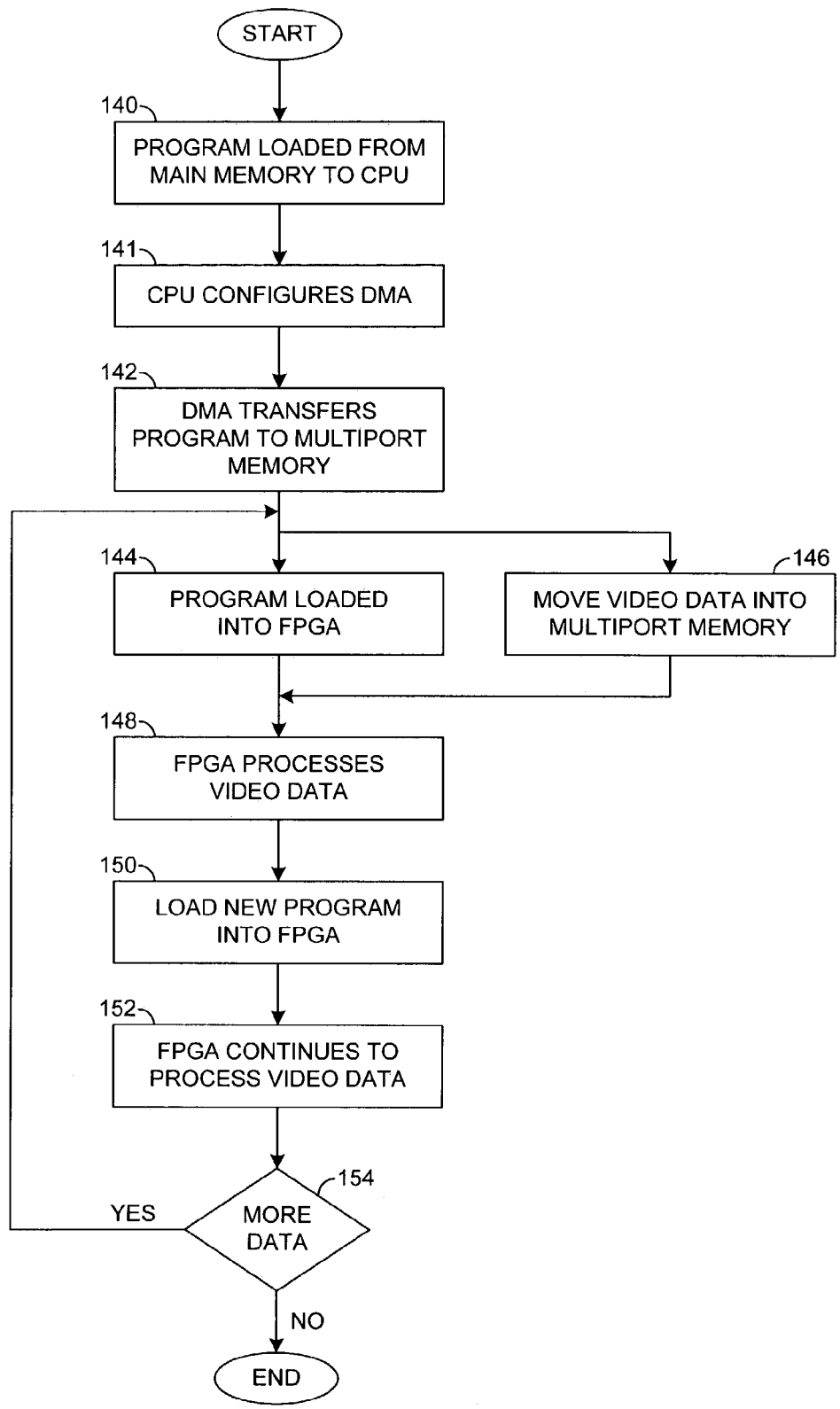
FIG. 2 is a flow diagram of a method for operating the circuit.

Referring to FIG. 2, a flow diagram of a method for operating the circuit 100 is shown. The CPU module 108 generally executes a program loaded from the main memory 102 (e.g., block 140) and gives commands to the DMA engine 104 (e.g., block 141). The DMA engine 104 may fill the multiport memory module 106 with one or more of the programs 116a–c (e.g., block 142). A program, for example 116a, may be loaded into the FPGA module 114 directly from the memory bank 120d through the port 118d (e.g., block 144). Meanwhile, the DMA engine 104 may move video data from the video I/O module 115 to, the multiport memory module 106 independently and substantially simultaneously as the FPGA module 114 is being loaded (e.g., block 146). The FPGA module 114 may then being processing the video data per the loaded program 116a (e.g., block 148).

The FPGA module 114 may be reprogrammed (e.g., load program 116b) while processing a single frame of video data (e.g., block 150). After reprogramming, the FPGA module 114 may perform additional operations on the video data (e.g., block 152). If additional frames and/or fields of video data are to be processed (e.g., the YES branch of decision block 154), the first program 116a may be reloaded into the FPGA module 114 (e.g., block 144). If no additional video data remains to be processed, (e.g., the NO branch of decision block 154), the processing may end.

Figure 3:
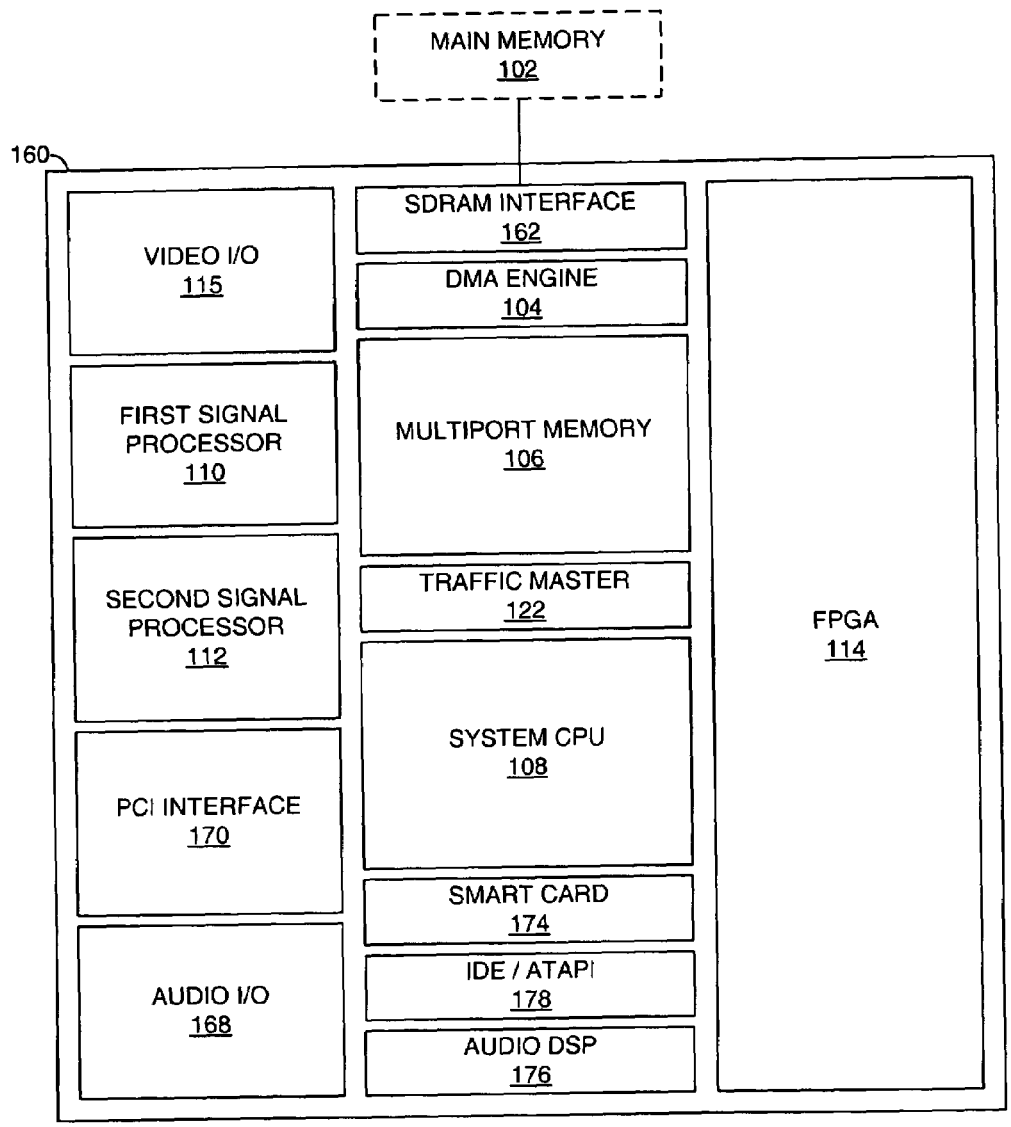
FIG. 3 is a diagram of an example die layout for a chip implementing the circuit.

Referring to FIG. 3, a diagram of an example die layout for a chip 160 implementing the circuit 100 is shown. The chip 160 generally comprises separate areas or regions for the DMA engine module 104, the multiport memory module 106, the CPU module 108, the video filter and scalar (e.g., first signal processor) module 110, the DCT (e.g., second signal processor) module 112, the FPGA module 114, the video I/O module 115, an SDRAM controller 162 (the main memory 102 being external to the chip 160), an audio input/output (I/O) module 168, a PCI bus interface module 170, a smart card interface module 174 and an audio DSP module 176 and a storage interface module 178 (e.g., an IDE/ATAPI interface)

The circuit 100 may be configured in a manner that employs the FPGA module 114 to implement the video DSP capability. The structure for the circuit 100 generally includes the four bank 120a–d multiport memory module 108 and all associated SDRAM logic 162 and memory 102. The programs 116a–c (e.g., bit files) may be loaded directly from the local multiport memory module 106 (indirectly from the main memory module 102) with an overlay for a task at to be performed by the FPGA module 114. By achieving less than a one millisecond load time, reprogramming of the FPGA module 114 may be feasible multiple times per video frame.

Hardware reconfigurable computing for the FPGA module 114 may be applied for multi-standard video codec supporting the following standards: MPEG2 standard-definition encode, MPEG2 high-definition decode, MPEG-4 encode/decode, H.264 high-definition decode, H.264 standard-definition encode, WM-9 encode/decode and future versions. A swappable pipeline within the multiport memory module 106 may allow for loading of the FPGA module 114 simultaneously with other operations. Preexisting register transfer level language (RTL) code may be synthesized to target the FPGA module 114 through the programs 116a–c. A library of the programs 116a–c may be built up and maintained so that, along with software additions, the chip 160 generally evolves to greater flexibility and power over time.

Operations for other blocks/modules of the chip 160 may be considered for implementation in the FPGA module 114 (e.g., entropy engines). Other unknown standards may possibly be supported without new silicon, such as graphics acceleration. Furthermore, the FPGA module 114 may also be used in part to support a self-test capability for the chip 160. The FPGA module 114 may allow an effective use of hardware if (i) the hardware partitioning is made correctly to take advantage of the best features of both the ASIC and FPGA technology, (ii) there may be sufficient different uses of the re-programmable elements and (iii) the reconfiguration time is sufficiently low enough to make effective use of the reconfigurable hardware.

Historical problems in dealing with embedded FPGA designs have generally been on the tool side. In particular, verification should be carefully thought through. The area/gate efficiency of the FPGA module 114 is about ½₀ that of an ASIC. The low density, combined with an engineering tendency to add more and more blocks of programmable logic, could potentially lead to chip bloat with the majority of the die area devoted to programmable logic. Therefore careful attention should be paid to keeping the silicon area under control by identifying the key potions of the chip 160, which benefit from embedded FPGA implementation.

The architecture of the present invention generally lowers system cost by (i) reducing main memory bandwidth criteria by using the DMA engine 104 to prefetch and store data once for each macroblock and (ii) reducing on-chip buffer memory by sharing common memory within the multiport memory module 106. The FPGA module 114 may also lower costs because with an unbounded number of complex codecs to support, the FPGA module 114 may be reprogrammed to support the different codecs. Lower costs may further be achieved because for each codec standard, only part of the standard may be implemented in the FPGA module 114 at one time. The FPGA may be time sliced by loading different programs 116a–c at different times to enable different functions to be performed. The size of the FPGA module 114 may be less than a total resulting size to implement all aspects of the codec standards simultaneously. The FPGA module 114 generally lowers time to market, as a new codec standard may be implemented without changing the hardware for the circuit 100. Thus the FPGA module 114 may increase a flexibility of the circuit 100 to handle new (as yet unknown) standards.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood-by those skilled in the art that various changes in form and details may be made without departing from the spirit and scope of the invention.

The invention claimed is:

1. A circuit comprising:
   a multiport memory;
   a direct memory access engine configured to transfer a first program to said multiport memory;
   a programmable gate array configured to (i) load said first program directly from said multiported memory to program a codec function and (ii) generate a video output signal by performing said codec function on a video input signal using video data exchanged with said multiport memory; and
   a processor having a direct connection to said programmable gate array to transfer at least one parameter used in said codec function to said programmable gate array.

2. The circuit according to claim 1, further comprising:
   a solid state memory configured to store said first program.

3. The circuit according to claim 1, wherein said processor is configured to load a second program from said multiport memory.

4. The circuit according to claim 3, wherein said processor is further configured to transfer a plurality of commands generated by an execution of said second program to said programmable gate array.

5. The circuit according to claim 1, wherein said first program is unique to one standard for digital video.

6. The circuit according to claim 1, wherein said at least one parameter comprises at least one of (i) a decimation parameter and (ii) a filter coefficient.

7. The circuit according to claim 1, wherein said programmable gate array is further configured to perform motion compensation for said video input signal.

8. The circuit according to claim 1, wherein said multiport memory comprises:
   a plurality of memory blocks each accessible substantially simultaneously through a respective one of a plurality of ports.

9. The circuit according to claim 8, wherein said programmable gate array is directly connected to a first port and a second port of said multiport memory to access a first memory block and a second memory block of said memory blocks.

10. The circuit according to claim 9, further comprising:
    a video filter and scalar module directly connected to a third port of said multiport memory to access a third memory block of said memory blocks; and
    a discrete cosine transform module directly connected to a fourth port of said multiport memory to access a fourth memory block of said memory blocks.

11. A method for operating a circuit, comprising the steps of:
    (A) transferring a first program to a multiported memory by a direct memory access transfer;
    (B) loading said first program directly from said multiported memory to a programmable gate array to program a codec function;
    (C) generating a video output signal by performing said codec function on a video input signal using video data exchanged with said multiport memory; and
    (D) transferring a parameter used in said codec function across a direct connection between a processor and said programmable gate array.

12. The method according to claim 11, further comprising the step of:
    loading said programmable gate array from said multiported memory with a second program to process said video input signal.

13. The method according to claim 12, wherein both said first program and said second program are loaded into said programmable gate array during a frame of said video signal.

14. The method according to claim 11, further comprising the step of:
    loading a second program from said multiported memory to said processor to program a second function.

15. The method according to claim 14, further comprising the step of:

generating said parameter for said gate programmable array by performing said second function.

16. The method according to claim 15, wherein generating said video output signal is in response to said parameter.

17. The method according to claim 11, further comprising the step of:

transferring said video input signal to said multiported memory by said direct memory access transfer.

18. The method according to claim 17, further comprising the step of:

transferring said video output signal to said multiported memory.

19. The method according to claim 18, wherein said multiported memory is configured to receive (i) a first macroblock of said video input signal and (ii) a second macroblock of said video output signal substantially simultaneously.

* * * * *